United States Patent [19]
Kakimoto et al.

[11] Patent Number: 4,809,960
[45] Date of Patent: Mar. 7, 1989

[54] BUSHING ASSEMBLY

[75] Inventors: Toshihiko Kakimoto, Isehara; Satoshi Osawa, Sagamihara, both of Japan

[73] Assignee: Nissan Motor Co., Ltd., Japan

[21] Appl. No.: 173,146

[22] Filed: Mar. 25, 1988

[30] Foreign Application Priority Data

Mar. 26, 1987 [JP] Japan .................................. 62-70496
Mar. 27, 1987 [JP] Japan .................................. 62-71902

[51] Int. Cl.4 .............................................. F16F 1/38
[52] U.S. Cl. .................................. 267/141; 248/634;
  248/635; 267/141.3; 267/153; 267/280;
  267/281; 267/293; 277/212 R; 384/147;
  384/153; 384/222; 403/225; 403/228
[58] Field of Search .......................... 267/140.1-141.7,
  267/152, 153, 154, 140, 292-294, 276, 279-282,
  219, 220, 269-270; 280/716-717; 384/138, 222,
  282, 147, 297, 220, 221, 153; 403/225-228;
  277/212; 248/634, 635

[56] References Cited

U.S. PATENT DOCUMENTS

| 3,975,007 | 8/1976 | Chorkey | 267/141.4 X |
|---|---|---|---|
| 3,976,338 | 8/1976 | Trachte et al. | 267/279 X |
| 4,002,327 | 1/1977 | Damon | 267/141.4 X |
| 4,032,202 | 6/1977 | Ishikawa et al. | 267/280 X |
| 4,083,545 | 4/1978 | Herbenar | 267/269 X |
| 4,097,057 | 6/1978 | Goodrich, Jr. et al. | 267/280 X |
| 4,109,979 | 8/1978 | Estague | 267/269 X |
| 4,326,816 | 4/1982 | Morisawa | 403/228 |
| 4,458,918 | 7/1984 | Rumpel | 267/270 X |
| 4,491,429 | 1/1985 | Matoba et al. | 267/154 X |
| 4,619,544 | 10/1986 | Laidely | 403/225 X |
| 4,621,830 | 11/1986 | Kanai | 280/716 X |
| 4,667,943 | 5/1987 | Izumi et al. | 403/228 X |
| 4,720,075 | 1/1988 | Peterson et al. | 267/292 X |
| 4,720,120 | 1/1988 | Shimatani et al. | 267/292 X |
| 4,741,521 | 5/1988 | Schiffner et al. | 267/293 X |
| 4,744,677 | 5/1988 | Tanaka et al. | 267/292 X |
| 4,762,310 | 8/1988 | Krajewski et al. | 267/270 X |
| 4,767,108 | 8/1988 | Tanaka et al. | 267/293 X |

FOREIGN PATENT DOCUMENTS 1555216 2/1967 Fed. Rep. of Germany .
61-127934 6/1986 Japan .

Primary Examiner—Douglas C. Butler
Attorney, Agent, or Firm—Leydig, Voit & Mayer

[57] ABSTRACT

A bushing assembly for use in a suspension of an automotive vehicle. The bushing assembly is comprised of inner and outer cylinder members which are coaxial and spaced from each other. An elastic member and a rigid sleeve member are disposed between the inner and outer cylinder members. A sliding member is disposed between the inner cylinder member and the rigid sleeve member in order to reduce torsion spring effect of the elastic member. The sliding member is prevented from its axial displacement upon contacting with a radially outwardly extending retainer section formed in the inner cylinder member. Additionally, a generally cap-shaped seal rubber is provided to accomplish seal between the end section of the rigid sleeve member and the end section of the inner cylinder member. The seal rubber is located outside the inner cylinder member retainer section and spaced from the outer peripheral part of the inner cylinder member retainer section, thereby reducing resistance in relative rotation between the inner and outer cylinder members maintaining effective seal.

17 Claims, 3 Drawing Sheets

BUSHING ASSEMBLY

BACKGROUND OF THE INVENTION

1. Field of the Invention

The present invention relates to improvements in a bushing assembly, for example, for use in automotive vehicles, and more particularly to the bushing assembly of the type wherein a seal rubber is disposed between an inner cylinder member and a rigid sleeve member disposed between the inner cylinder member and an outer cylinder member in order to accomplish seal, in which an elastic member is disposed between the rigid sleeve member and the outer cylinder member while a sliding member is provided between the rigid sleeve and the inner cylinder member to reduce a torsion spring effect of the elastic member.

2. Description of the Prior Art

Bushing assemblies have been used, for example, at joints between an upper control arm of a double wishbone type suspension and a vehicle body in an automotive vehicle. Such a bushing assembly usually includes inner and outer cylinder members which are coaxial and spaced from each other. The inner cylinder member is connected to an upper control arm side while the outer cylinder member is connected to a vehicle body side. An elastic member is disposed between the inner and outer cylinder members to absorb a relative displacement of the inner and outer cylinder members in the radial direction. Additionally, a sliding member is provided between the elastic member and the inner cylinder member to make possible a relative rotation around the axis between the inner and outer cylinder members.

A bushing assembly of this type is disclosed, for example, in Japanese Patent Provisional Publication No. 61-127934. This bushing assembly is provided with a rigid sleeve disposed between the elastic member and the sliding member. The rigid sleeve is formed with an outer flange including a radially outwardly extending section from which a cylindrical section extends axially. A seal rubber is provided inside the cylindrical section and in such a manner as to be brought into contact with the retainer member formed at the end section of the inner cylinder member and/or the outer peripheral surface of the sliding member, thereby to accomplish seal at least between it and the retainer member.

However, in such a conventional bushing assembly, the seal rubber is brought into contact with the inner cylinder member retainer member and the sliding member, and therefore there develops a larger friction therebetween thereby to obstruct a relative rotation between the inner and outer cylindr members. Additionally, since the seal rubber is relatively short and rigid, dimension error and relative displacement of the retainer member or the like cannot be effectively absorbed, so that an excess or a shortage in contact width of the seal rubber tends to be made thereby lowering seal durability and seal effect. Furthermore, even inf a slight amount of water and/or mud penetrates through the seal section of the seal rubber, it is liable to reach the sliding member thereby deteriorating the sliding member.

SUMMARY OF THE INVENTION

A bushing assembly of the present invention is comprised of inner and outer cylinder members which are disposed coaxial and spaced from each other. An elastic member is disposed between the inner and outer cylinder members. A sliding member is disposed between the inner cylinder member and the elastic member to reduce effect of torsion spring of the elastic member. A rigid sleeve member is disposed between the sliding member and the elastic member. The rigid sleeve member includes an outwardly extending outer flange which has a radially outwardly extending section. Additionally, an annular seal rubber is disposed between the rigid sleeve member outer flange and the inner cylinder member. The seal rubber has an inner peripheral section in contact with the inner cylinder member at the outer peripheral surface to maintain seal, and an outer peripheral section securely supported by the rigid sleeve member outer flange. The inner surface of the seal rubber is spaced from members located inside the seal rubber.

By virtue of the seal rubber spaced from the members located thereinside, effective seal is maintained without obstructing the relative rotational displacement between the inner and outer cylinder members. Additionally, since the seal rubber is formed relatively long in dimention from the sleeve member outer flange to the inner cylinder member, the dimension error and relative movement of the inner and outer cylinder members can be effectively absorbed.

BRIEF DESCRIPTION OF THE DRAWINGS

In the drawings, like reference numerals desigante corresponding elements and parts throughout all the figures, in which.

DETAILED DESCRIPTION OF THE INVENTION

Figure 1:
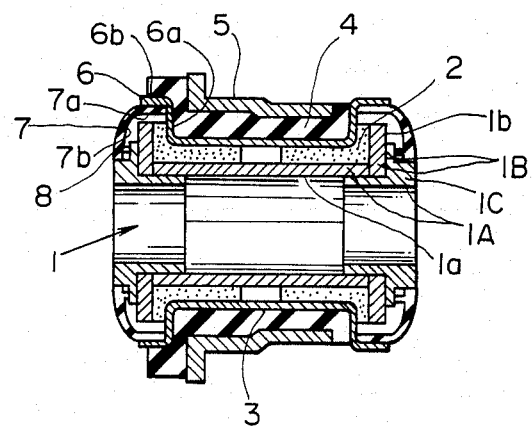
FIG. 1 is a vertical cross-sectional view of a first embodiment of a bushing assembly in accordance with the present invention.

Referring now to FIG. 1, there is shown a first embodiment of a bushing assembly in accordance with the present invention. The bushing assembly is comprised of an inner cylinder assembly or member 1 formed with a bore in which an installation bolt (not shown) is disposed so as to pass therethrough. The bushing assembly is, for example, used for a joint between an upper control arm in a double wishbone type suspension of an automotive vehicle and a vehicle body, in which the installation bolt is securely connected to vehicle body side installation brackets. In this embodiment, the inner cylinder assembly 1 includes a cylindrical member 1a for supporting thereon annular sliding members 2. A pair of radially outwardly extending annular retainers 1b are secured to the opposite end faces of the cylindrical member 1a in such a manner as to prevent the outward axial displacement of the sliding members 2.

A pair of annular end collars 1c are securely fitted respectively to the retainer members 1b in such a manner that each collar clamps the retainer member 1b to the cylindrical member 1a. Each end collar 1c includes small- and large-diameter sections, and a radially outwardly extending annular flange section though not identified. The small diameter section supports the end section of the cylindrical member 1a and the retainer member 1b at the inner surface. The flange section is in contact with the outer side surface of the retainer member 1b. The large-diameter section is generally the same in outer diameter as the cylindrical member 1a and forms an end section of the end collar 1c. In this embodiment, the cylindrical member 1a and the end section of the end collar 1c constitute a cylindrical part 1A of the bushing assembly, while the retainer member 1b and the flange section of the end collar 1c constitutes a retainer part 1B of the bushing assembly.

A rigid sleeve 3 is disposed outside the sliding member 2 in such a manner that the sliding members 2 are positioned between it and the inner cylinder assembly 1. In this embodiment, the rigid sleeve 3 is integrally formed with an outer flange 6 which includes a radially outwardly extending annular flange section 6a. The flange section 6a is integrally provided at its outer periphery with an axially extending cylindrical section 6b. Accordingly, the outer flange 6 defines thereinside an annular space in which a seal rubber 7 is fittingly supported.

The seal rubber 7 of this embodiment is generally cap-sealed to include a cylindrical wall section 7a, and an annular side wall section 7b. The cylindrical wall section 7a fits in the outer flange 6 of the rigid sleeve 3 and in contact with the inner surface of the outer flange cylindrical section 6b. The annular side wall section 7b is fitted at its inner peripheral portion with the outer peripheral surface of the large-diameter section of the end collar 1c in such a manner as to maintain seal. The inner peripheral portion of the annular side wall section 7b is formed into a sealing section 8 which facilitates the seal between the seal rubber 7 and the inner cylinder assembly 1. The shape of the sealing section 8 will be discussed in detail after. It will be seen that the inner surface of the seal rubber 7 is separate and spaced from the retainer member 1b and the sliding member 2 since the seal rubber is outwardly bulged to take the cap-shape.

It will be understood that fitting of the seal rubber 7 into the annular space of the outer flange 6 may be facilitated by providing an annular outer metal member (not shown in FIG. 1) to the cylindrical wall section 7a of the seal rubber 7, in which the outer metal member is press-fitted inside the outer flange cylindrical section 6b. Also in this case, it is preferable that at least a part of the seal rubber 7 is in contacat with the rigid sleeve 3 to maintain seal. This will be discussed after with reference to FIG. 3.

A generally annular elastic member 4 formed of elastomeric material is disposed on the rigid sleeve 3. Furthermore, an outer cylinder member 5 is disposed on or around the elastic member 4 in such a manner that the elastic member 4 is fittingly interposed between it and the rigid sleeve 3. The outer cylinder member 5 is securely connected, for example, to the upper control arm of the double wishbone type suspension of the atuomotive vehicle.

As discussed above, according to the first embodiment bushing assembly, the seal rubber is formed generally cap-shaped and therefore its inner surface is not brought into contact with the retainer part of the inner cylinder member. Thus, in the embodiment, seal is accomplished without contact of the seal rubber with the outer peripheral surface and the outer end periphery of the retainer part. Accordingly, the seal of this embodiment is accomplished by contacting the seal rubber with the outer peripheral surface of the inner cylinder member which is smaller in outer diameter than the retainer part. More specifically, the seal rubber is in contact with the outer peripheral surface of the cylindrical part 1A and/or the inner peripheral section of the retainer part 1B. Accordingly, during relative rotation of the outer cylinder member 5 to the inner cylinder member 1, friction resistance of the seal rubber against the inner cylinder member 1 is smaller and therefore the relative rotation is not so obstructed. This not only prevents an excessive torsion of the elastic member but also reduces the resistance of the relative rotation between the inner and outer cylinder members, thereby improving ride-on comfortableness of the vehicle in case the bushing assembly is used in the suspension of the vehicle.

Figure 2:
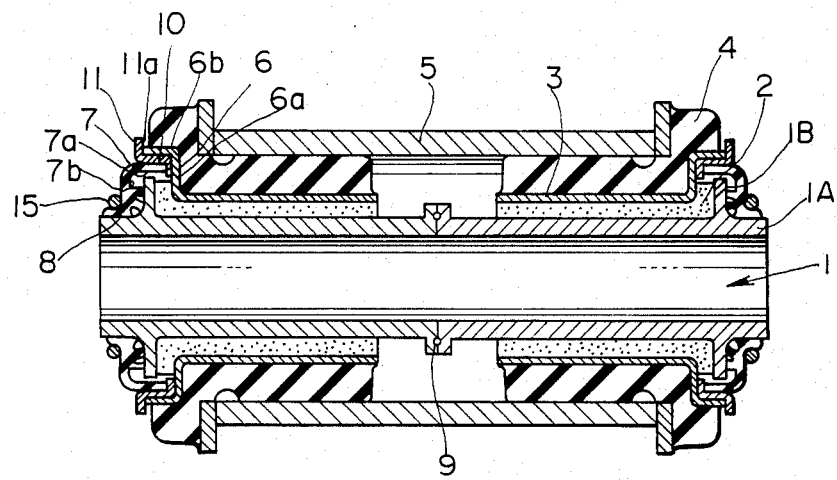
FIG. 2 is a vertical cross-sectional view of a second embodiment of the bushing assembly in accordance with the present invention.

FIG. 2 illustrates a second embodiment of the bushing assembly according to the present invention, which is similar to the first embodiment of FIG. 1. In this embodiment, the inner cylinder assembly or member 1 consists of two counterparts which are axially joined to each other through an O-ring 9 in a process where the installation bolt (not shown) is inserted into the bore of the inner cylinder assembly 1 during assembly of the bushing assembly. Additionally, the retainer part 1B of the inner cylinder assembly 1 is integral with the cylindrical part 1A of the same.

Furthermore in this embodiment, in order to further facilitate the assembly of the various members relative to the outer cylinder member 5, not only each of the inner cylinder member 1 and the sliding member 2 but also each of the rigid sleeve 3 and the elastic member 4 consists of two divided counterparts which are connected axially side by side.

As shown, the seal rubber 7 is securely provided with an annular outer metal member 10 attached to the outer surface of the seal rubber side wall section 7a and in contact with the inner surface of outer flange cylindrical section 6b. The outer metal member 10 fits inside the outer flange cylindrical section 6b. The outer metal member 10 is generally cylindrical and formed at its outer end with a radially outwardly extending flange section 11a which is brought into contact with the edge of the outer flange cylindrical section 6b and accordingly serves as a stop when the outer metal member 10 is press-fitted inside the outer flange cylinder section 6b.

Figure 3:
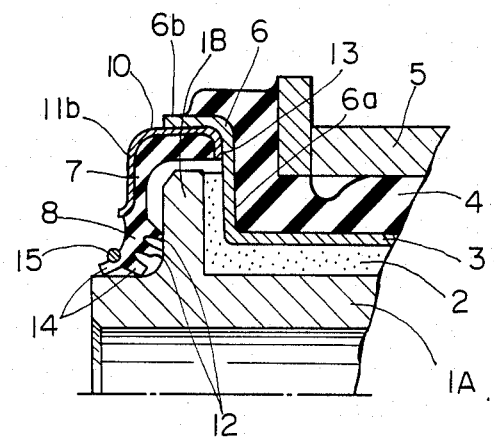
FIG. 3 is a vertical cross-sectional view of an essential part of a third embodiment of the bushing assembly in accordance with the present invention.

FIG. 3 illustrates an essential part of a third embodiment of the bushing assembly according to the present invention, which is similar to the second embodiment with the exception that the outer metal member 10 is integrally formed at its end with a radially inwardly extending annular flange section 11b so as to cover a considerable part of the outer surface of the seal rubber side wall section 7b. This metal member flange section 11b functions to adjust the free length of the seal rubber 7, reinforce the rigidity of the seal rubber 7, prevent tipping of the seal rubber 7 with flying stone, and control the biasing force of an axial sealing portion 12 of the seal rubber 7 against the inner portion of the retainer part 1B.

The axial sealing portion 12 is formed at the inner surface of the annular side wall section 7b of the seal rubber 7 and bifurcated in cross-section as shown in FIG. 3 so as to be effectively brought into contact with the inner peripheral section of the inner cylinder member retainer part 1B. Additionally, a radial sealing portion 14 is formed at the inner peripheral portion of the annular side wall section 7b of the seal rubber 7 and bifurcated in cross-section as shown in FIG. 3 so as to be effectively brought into contact with the outer periphery of the inner cylinder member 1. These sealing portions 12, 14 constitute the sealing section 8. It will be understood the sealing section 8 in the first embodiment also includes the axial and radial sealing portions 12, 14.

In this embodiment, an annular spring ring 15 is disposed on the outer periphery of the radial sealing portion 15 in such a manner that the bifurcated annular portions are maintained to be separate from each other, thereby improving sealing effect of the radial sealing portion 14. It will be understood that the biasing force of the radial sealing section 14 against the inner cylinder member 1 is changed by altering the diameter of the spring ring 15. In this embodiment, the cylindrical wall section 7a of the seal rubber 7 is formed at its end with an annular projection 13 which is brought into contact with the rigid sleeve 3 thereby to accomplish seal.

Figure 4:
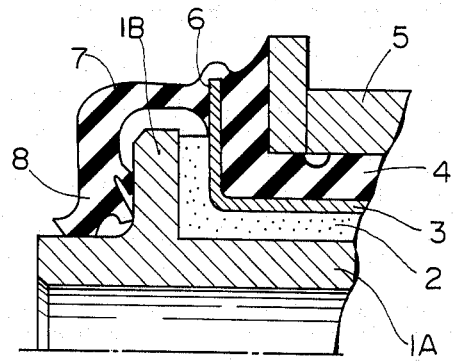
FIG. 4 is a vertical cross-sectional view similar to FIG. 3 but showing a fourth embodiment of the bushing assembly in accordance with the present invention.

FIG. 4 illustrates an essential part of a fourth embodiment of the bushing assembly in accordance with the present invention, which is similar to the third embodiment of FIG. 3 with the exception that the seal rubber 7 is integral with the elastic member 4 and therefore formed of valcanized rubber. In this connection, the outer flange 6 of the rigid sleeve 3 is only the radially outwardly extending annular section without the axially extending cylindrical section (6b in FIG. 3). With the thus arranged seal rubber 7, production cost of the bushing assembly can be lowered while enabling the seal rubber 7 to be lower in rigidity. Therefore, friction resistance of the seal rubber 7 against the inner cylinder member 1 during relative rotation therebetween is further lowered, and follow-up ability of the seal rubber 7 can be improved.

Figure 5:
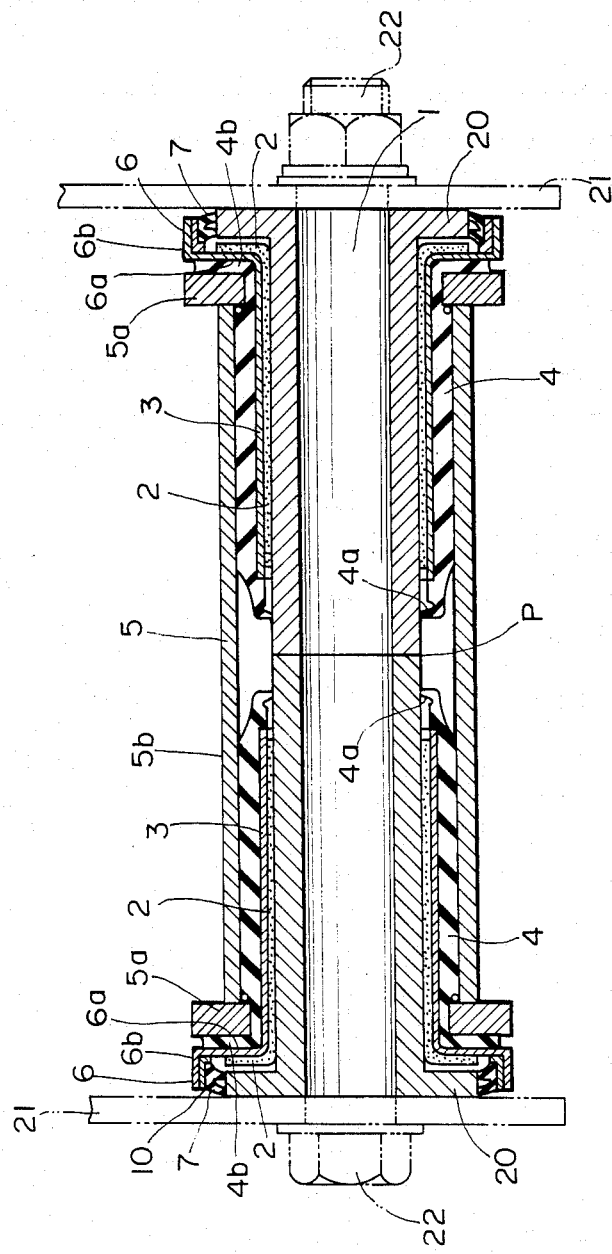
FIG. 5 is a vertical cross-sectional view of a fifth embodiment of the bushing assembly in accordance with the present invention.

FIG. 5 illustrates a fifth embodiment of the bushing assembly according to the present invention, which is similar to the second embodiment of FIG. 2. In this embodiment, each of the two divided counterparts constituting the inner cylinder member 1 is integrally formed at its extreme end with a radially outwardly extending annular flange 20 which serves as the retainer part 1B. Thus, the flange 20 is located axially outside the sliding member 2 so as to prevent the axially outward movement of the sliding member 2. The seal rubber 7 is securely fixed through the outer metal member 10 to the outer flange 6 of the rigid sleeve 3 and brought into contact with the inner cylinder member flange 20 so as to maintain seal.

In this embodiment, the elastic member 4 is formed with an annular seal lip section 4a which projects radially inwardly to be brought into contact with the outer peripheral surface of the inner cylinder member 1 so as to maintain seal. The seal lip section 4a is located near a parting portion P of the two divided counterparts of the inner cylinder member 1.

Assembly of the bushing assembly of FIG. 5 is accomplished as follows: A one-piece unit of the rigid sleeve 3, the elastic member 3 and a ring plate 5a (forming part of the outer cylinder member 5) is fitted on the outer peripheral surface of the sliding member 2. This one-piece unit is fitted on the inner cylinder member 1 from the side of the extreme end of the inner cylinder member 1 which extreme end is far from the flange 20. Then, the outer cylinder member 5 is also mounted on the one-piece unit in the same condition. Thereafter, the two divided counterparts of the inner cylinder member 1 are joined with each other. In a condition where a collar or the like of the suspension control arm is fitted on the outer cylinder member 5, the elastic members 4, 4 are supported inside the outer cylinder member 5, and the two divided counter parts of the inner cylinder 1 are joined with each other in which the ring plates 5a, 5a are brought into contact with the respective end faces of the cylindrical member 5b of the outer cylinder member 5. Thereafter, the thus assembled bushing assembly is slided into between installation brackets 21, 21 projected from the vehicle body side, in which the flanges 20, 20 of the inner cylinder member 1 are brought into contact with the respective installation brackets 21, 21. Then, the installation bolt 22 is inserted through the installation brackets 21, 21 and the inner cylinder member 1 and fastened in position. Thus, the bushing assembly of FIG. 5 is put into a practically usable condition.

With the thus configured bushing assembly, the seal rubbers 7 prevent water and the like from entering a space in which the sliding members 2 are disposed. This protects the inner cylinder member 1 and the sliding members 2, 2 from corrosion or being rusted, thereby avoiding failure in sliding or bearing between the inner cylinder member 1 and the sliding members 2, 2. The axial movement of each seal rubber 7 is supported by the ring plate 5a and the flange 20. The radial movement of each seal rubber 7 corresponds only to the deformation of the elastic member 4, and therefore no excess or no shortage in contacting force against the outer periphery of the flange 20 is caused thereby to improve the reliability of sealing.

Although a sufficient seal is obtained by the seal rubber 7, there is possiblity of water and the like penetrating to the inside of the seal rubber 7 during deformation of the seal rubber 7. When the thus penetrating water and the like reach the vicinity of the central portion of the inner cylinder member 1, the elastic member seal lip section 4a prevents the water from reaching the parting portion P of the inner cylinder member 1, thereby avoiding penetration of water into the bore of the inner cylinder member 1. Accordingly, even if sealing by the seal rubber 7 is insufficient or failed, water and the like cannot enter the bore of the inner cylinder member 1. It will be understood that even if the inner and outer cylinder members 1, 5 make a torsional relative displacement, displacement applied to the seal lip sections 4a, 4a are negligible because the seal lip sections 4a, 4a are located at the central portion of the inner cylinder member 1 formed by joining the two divided counterparts. Additionally, since each seal lip section 4a is formed integral with the elastic member 4, no separate material is required to obtain a reliable seal effect.

In addition, the seal lip section 4a of each elastic member 4 functions to prevent the inner cylinder member 1 from getting out of each sliding member 2 owing to friction between it and the inner cylinder member 1, thereby improving assembly operation efficiency of the bushing assembly.

As shown, since the flanges 20 are formed integral with the iner cylinder member in such a manner that the inner surfaces of them are flush with each other, insertion of the installtion bolt 22 can be facilitated, thereby further improving the assembly operation efficiency. Further, the seal lip section 4a also function to assist centering of the inner cylinder member 1 relative to the outer cylinder member 5, thus facilitating insertion of the installation bolt 22. Furthermost, each elastic member 4 is formed with a radially outwardly extneding flange section 4b interposed between the rigid sleeve 3 and the outer cylinder member 5, and therefore damping effect of the elastic member 4 in the axial direction can be obtained maintaining a high rigidity thereof in the same direction. Additionally, since each seal rubber 7 is positioned between the rigid sleeve outer flange 6 and the inner cylinder member flange 20, tipping resistance of the seal rubber 7 is effectively improved.

What is claimed is:

1. A bushing assembly comprising:
   inner and outer cylinder members which are disposed coaxial and spaced from each other;
   an elastic member disposed between said inner and outer cylinder members;
   a sliding member disposed between said inner cylinder member and said elastic member to reduce effect of torsion spring of said elastic member;
   a rigid sleeve member disposed between said sliding member and said elastic member, said rigid sleeve member including an outer flange extending outwardly, said outer flange having a radially outwardly extending section;
   an annular seal rubber disposed between said rigid sleeve member outer flange and said inner cylinder member, said annular seal rubber having an inner peripheral section in contact with said inner cylinder member at outer peripheral surface to maintain seal, and an outer peripheral section securely supported by said rigid sleeve member outer flange; and
   means for spacing inner surface of said seal rubber from members disposed inside said seal rubber.

2. A bushing assembly as claimed in claim 1, wherein said seal rubber is generally cap-shaped to defined a space between the inner surface thereof and said members disposed inside said seal rubber.

3. A bushing assembly as claimed in claim 1, wherein said inner cylinder member is connected to a first support member, and said outer cylinder member is connected to a second support member, said first and second support members being movable relative to each other.

4. A bushing assembly as claimed in claim 1, wherein said inner cylinder member includes a cylindrical section for supporting thereon said sliding member, and a retainer section formed in the vicinity of an extreme end of said cylindrical section and brought into contact with an end section of said sliding member.

5. A bushing assembly as claimed in claim 3, wherein said retainer section is integral with said cylindrical section.

6. A bushing assembly as claimed in claim 1, wherein said outer flange of said sleeve member includes a cylindrical section extending axially and integral with said radially outwardly extending section at outer periphery.

7. A bushing assembly as claimed in claim 6, wherein said seal rubber includes a cylindrical section press-fitted inside said cylindrical section of said rigid sleeve.

8. A bushing assembly as claimed in claim 1, wherein said seal rubber is integral with said elastic member and formed of vulcanized rubber.

9. A bushing assembly as claimed in claim 7, further comprising an annular outer metal member attached on said seal rubber cylindrical section, said metal member being press-fitted inside said outer flange cylindrical section.

10. A bushing assembly as claimed in claim 9, wherein said metal member includes a cylindrical section attached to said seal rubber cylindrical section, and a first flange section extending radially outwardly from said cylindrical section, said first flange section being in contact with said outer flange cylindrical section of said rigid sleeve.

11. A bushing assembly as claimed in claim 9, wherein said metal member includes a cylindrical section attached to said seal rubber cylindrical section, and a second flange section extending radially inwardly from said cylindrical section, said second flange section being in contact with outer surface of said seal rubber.

12. A bushing assembly as claimed in claim 4, wherein said seal rubber inner peripheral section includes a first sealing portion for accomplished a radial seal against the outer peripheral surface of said cylindrical section of said inner cylinder member, and a second sealing portion for accomplishing an axial seal against side surface of said retainer section of said inner cylinder member.

13. A bushing assembly as claimed in claim 12, wherein said first sealing portion is formed bifurcated in cross-section to form two annular contacting portions in contact with the outer peripheral surface of said innr cylinder member cylindrical section.

14. A bushing assembly as claimed in claim 13, further comprising a spring ring disposed along outer periphery of said first sealing portion to cause said two annular contacting portions to separate from each other.

15. A bushing assembly as claimed in claim 1, wherein said inner cylinder member includes first and second counterparts which are axially joined with each other at a parting portion.

16. A bushing assembly as claimed in claim 15, wherein said elastic member extends axially inwardly over said rigid sleeve and said sliding member and has an annular sealing lip section in contact with the outer peripheral surface of said inner cylinder member at a position axially outward relative to said parting portion of said inner cylinder member.

17. A bushing assembly comprising:
    inner and outer cylinder members which are disposed coaxial and spaced from aech other, said inner cylinder member having a radially outwardly extending retainer section;
    an elastic member disposed between said inner and outer cylinder members;
    a sliding member disposed between said inner cylinder member and said elastic member to reduce effect of torsion spring of said elastic member, said sliding member being contactable with said inner cylinder member retainer section to be prevented in axial displacement thereof;
    a rigid sleeve member disposed between said sliding member and said elastic member, said rigid sleeve member including an outer flange extending outwardly, said outer flange having a radially outwardly extending section;
    a generally cap-shaped seal rubber disposed between said rigid sleeve member and said inner cylinder member, said seal rubber having an inner peripheral section in contact with said inner cylinder member at outer peripheral surface to maintain seal, and an outer peripheral section securely supported by said rigid sleeve member outer flange, said seal member being disposed outside said inner cylinder member retainer section and spaced from at least outer peripheral part of said inner cylinder member retainer section.

* * * * *